US 11,385,035 B2

(12) United States Patent
Brozda

(10) Patent No.: US 11,385,035 B2
(45) Date of Patent: *Jul. 12, 2022

(54) FIREARM MAGAZINE DISPENSER

(71) Applicant: X-MOD Gear LLC, Phoenixville, PA (US)

(72) Inventor: Evan Brozda, Phoenixville, PA (US)

(73) Assignee: XMOD Gear, LLC, Doylestown, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/014,498

(22) Filed: Sep. 8, 2020

(65) Prior Publication Data

US 2021/0131778 A1 May 6, 2021

Related U.S. Application Data

(63) Continuation of application No. 16/249,224, filed on Jan. 16, 2019, now Pat. No. 10,767,969, which is a
(Continued)

(51) Int. Cl.
*F42B 39/02* (2006.01)
*F16M 13/04* (2006.01)
(Continued)

(52) U.S. Cl.
CPC .............. *F42B 39/02* (2013.01); *F16M 13/04* (2013.01); *F41A 9/82* (2013.01); *F42B 39/26* (2013.01); *F41A 9/63* (2013.01); *F41A 17/38* (2013.01)

(58) Field of Classification Search
CPC ......... F42B 39/02; F42B 39/26; F16M 13/04; F41A 9/63; F41A 17/38
See application file for complete search history.

(56) References Cited

U.S. PATENT DOCUMENTS 3,283,954 A 11/1966 Spooner
5,131,563 A 7/1992 Yablans
(Continued)

FOREIGN PATENT DOCUMENTS

WO 2019/009988 A1 1/2019

OTHER PUBLICATIONS

Notice of Allowance received for U.S. Appl. No. 16/008,148, dated Nov. 30, 2018, 5 pages.
(Continued)

*Primary Examiner* — Corey N Skurdal
(74) *Attorney, Agent, or Firm* — Schott P.C.

(57) ABSTRACT

A firearm magazine case that is sized to hold a stack of firearm magazines, which case includes a spring mechanism at one end such that the magazines are advanced within the case to a ready position as the magazines are extracted from the case and configured to be mounted on a person's front or side so that the magazines are reached with an easy and natural motion, whereby the case is contoured to a person's body and is configured such that magazines are able to be extracted in one step, yet are effectively protected from the environment, the case includes an attachment mechanism that allows the case to be mounted either horizontally or vertically, according to the user's preference, the case's attachment mechanism, which consists of an "x" shaped ridge or lip which coordinates to accept a triangular insert that is attached to a person's clothing, whereby sliding any side of the "x" down over the triangle attaches the case in a secure manner, yet allows the case to be quickly and easily detached and/or replaced with a new magazine dispenser, and the case is stackable (and perhaps joiningly stackable) with other cases.

19 Claims, 13 Drawing Sheets

Related U.S. Application Data continuation of application No. 16/008,148, filed on Jun. 14, 2018, now Pat. No. 10,197,371.

(60) Provisional application No. 62/529,120, filed on Jul. 6, 2017.

(51) Int. Cl.
| | |
|---|---|
| *F42B 39/26* | (2006.01) |
| *F41A 9/82* | (2006.01) |
| *F41A 17/38* | (2006.01) |
| *F41A 9/63* | (2006.01) |

(56) References Cited

U.S. PATENT DOCUMENTS

| | | | |
|---|---|---|---|
| 5,613,482 | A | 3/1997 | Thai et al. |
| 6,000,589 | A | 12/1999 | Burdine |
| 6,817,135 | B1 | 11/2004 | Jackson |
| 7,364,057 | B2 | 4/2008 | Carroll |
| 7,950,554 | B2 | 5/2011 | Hoffner et al. |
| 8,104,640 | B2 | 1/2012 | Selvetti |
| 8,209,769 | B1 | 7/2012 | Ellis et al. |
| 8,231,038 | B2 | 7/2012 | Felts |
| 8,944,283 | B2 | 2/2015 | Shiell |
| 8,998,053 | B2 | 4/2015 | Cromie et al. |
| 9,144,294 | B2 | 9/2015 | Gregory et al. |
| 9,194,679 | B2 | 11/2015 | Orozco et al. |
| 10,197,371 | B2 | 2/2019 | Brozda |
| 10,767,969 | B2 | 9/2020 | Brozda |
| 2005/0189371 | A1 | 9/2005 | Harvey |
| 2010/0327006 | A1 | 12/2010 | Campo |
| 2015/0176934 | A1 | 6/2015 | Shaskan |
| 2015/0241151 | A1 | 8/2015 | Luebke |
| 2015/0327658 | A1 | 11/2015 | Swan et al. |
| 2015/0369578 | A1 | 12/2015 | Meunier et al. |

OTHER PUBLICATIONS

International Search Report and Written Opinion of the International Searching Authority for PCT Application No. PCT/US2018/037459 dated Sep. 11, 2018.

"Pouches Garrett Industries: GL SL MC—Spring Loaded Pistol Magazine Carrier," Posted on Oct. 12, 2008, Garrett Industries, accessed at https://www.milspecmonkey.com/index.php/weagear/pouches/210-garrett-industries-gi-slmc-spring-loaded-pistol-magazine-carrier, accessed on May 11, 2017, pp. 1-4.

Crane, D. "STRAC Technologies ST-1 F.A.S.T. System Mag Feeder for ULTRA-FAST," Weapon Reloads, accessed at https://www.defensereview.com/strac-technologies-st-1-fast-system-mag-feeder-for-ultra-fast-weapon-reloads/, accessed May 11, 2017, pp. 1-5.

MOAB23, "Magazine Dispenser Pack," Devian Art, accessed at http:/moab23.deviantart.com/art/Magazine-Dispenser-Pack-382637519, accessed on May 11, 2017, pp. 1-3.

Nicholas C., "Firearm Magazine Pez Dispenser," Posted on May 31, 2016, accessed at http://www.thefirearmblog.com/blog/2016/05/31/firearm-magazine-pez-dispenser/, accessed on May 11, 2017, pp. 1-19.

Non-Final Office Action received for the U.S. Appl. No. 16/008,148, dated Oct. 5, 2018, 6 pages.

Final Office Action received for the U.S. Appl. No. 16/249,224, dated Oct. 21, 2019, 5 pages.

Notice of Allowance received for the U.S. Appl. No. 16/249,224, dated May 4, 2020, 5 pages.

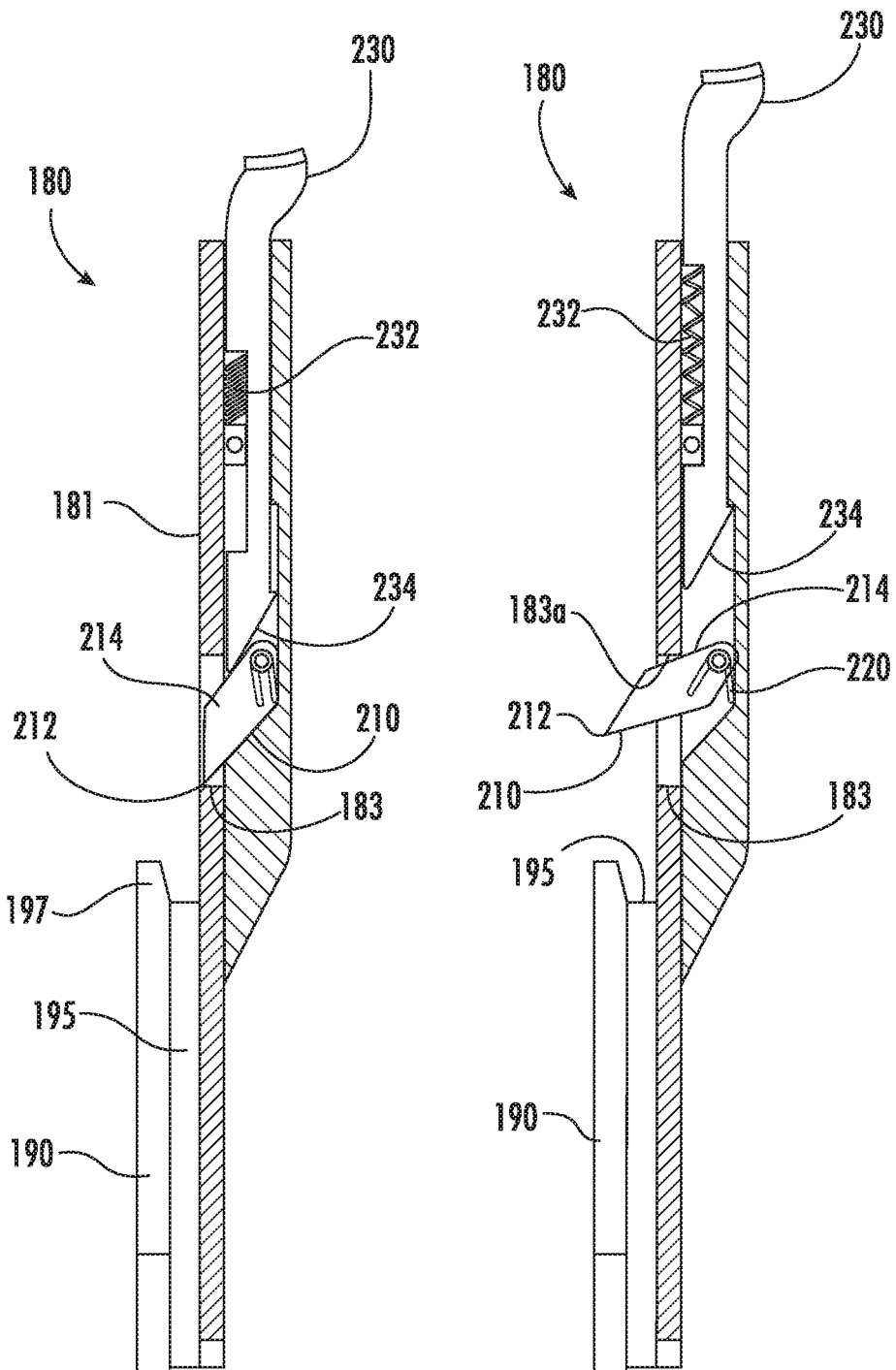

FIREARM MAGAZINE DISPENSER

BACKGROUND

In varying situations, when using a modern sporting rifle or military style rifle, the user often needs to carry additional ammunition to replenish the firearm when it is depleted, and also quickly reload their firearm in an efficient and effective manor while applying their focus and attention elsewhere. This magazine dispenser is a solution to an efficient and effective way to carry additional ammunition, dispense the ammunition via magazines while the user goes to the same exact location to retrieve a fresh magazine that is oriented in the hand the same way every time it is retrieved instead of searching for an additional magazine, extracting it, orienting it in the user's hand, and then having to reload by engaging the magazine in the firearm. This magazine dispenser also protects the magazine and ammunition from the elements and dirt/dust/debris when not in use and while in storage as well as when in the ready position. It is a quick and easy way to replenish the reserve being carried on the user, a way to carry and transport multiple magazine carriers, can be oriented and located per the user's preference, and is a way to organize and store magazines and the carriers themselves when not in use or in a reserve status.

BRIEF DESCRIPTION OF THE DRAWINGS

FIGS. 13 and 14 show cross sections through 13-13 and 14-14 of FIG. 12.

SUMMARY OF THE EMBODIMENTS

A magazine dispenser includes is sized to hold a stack of firearm magazines, and includes a biasing mechanism at one end such that the magazines are advanced within the dispenser to a ready position as magazines are extracted from the dispenser. The dispenser also includes at least the following features:

The dispenser is configured to be mounted anywhere on a user's clothing or equipment, including on a person's front or side or hip, or on a vest cover or a belt, so that the magazines are reached with an easy and natural motion;

The dispenser is contoured to a person's body;

The dispenser is configured such that magazines may be extracted in one step, as while there may be a cover to the case, a cover is not necessary to protect the magazines from the environment;

The dispenser includes an attachment mechanism that allows the case to be mounted either horizontally or vertically, according to a user's preference;

The dispenser's attachment mechanism, which consists of an "x" shaped ridge or lip, which ridge coordinates to accept a triangular insert, which triangular insert is configured to be attached to a person's clothing and/or gear, whereby sliding any side of the "x" down over the triangle attaches the case in a secure manner, yet allows the case to be quickly and easily detached and/or replaced with a new magazine dispenser;

The dispenser may be engageable to a vehicle, storage wall, post, or other object with proximity to firearms; and The dispenser is stackable (and perhaps joiningly stackable) with other dispensers.

DETAILED DESCRIPTION OF THE EMBODIMENTS

According to one preferred embodiment, a dispenser system is used to conveniently carry a stack of firearms or magazines and quickly dispense a firearm magazine.

For the purposes of the present disclosure, the term "magazine" shall refer to housing units typically associated with firearms such as M-16s, AR-15s or other firearms that house ammunition such as bullets. The term firearm shall refer to any instrument used to fire projectiles. However, the present disclosure should not be limited in scope to only M-16s and AR-15s, as this dispenser may apply to other firearms, such as shotguns, rifles, pistols, etc. The term "bias" shall refer to the method of consistently applying force for purposes such as retaining or extruding certain articles.

Figure 16:
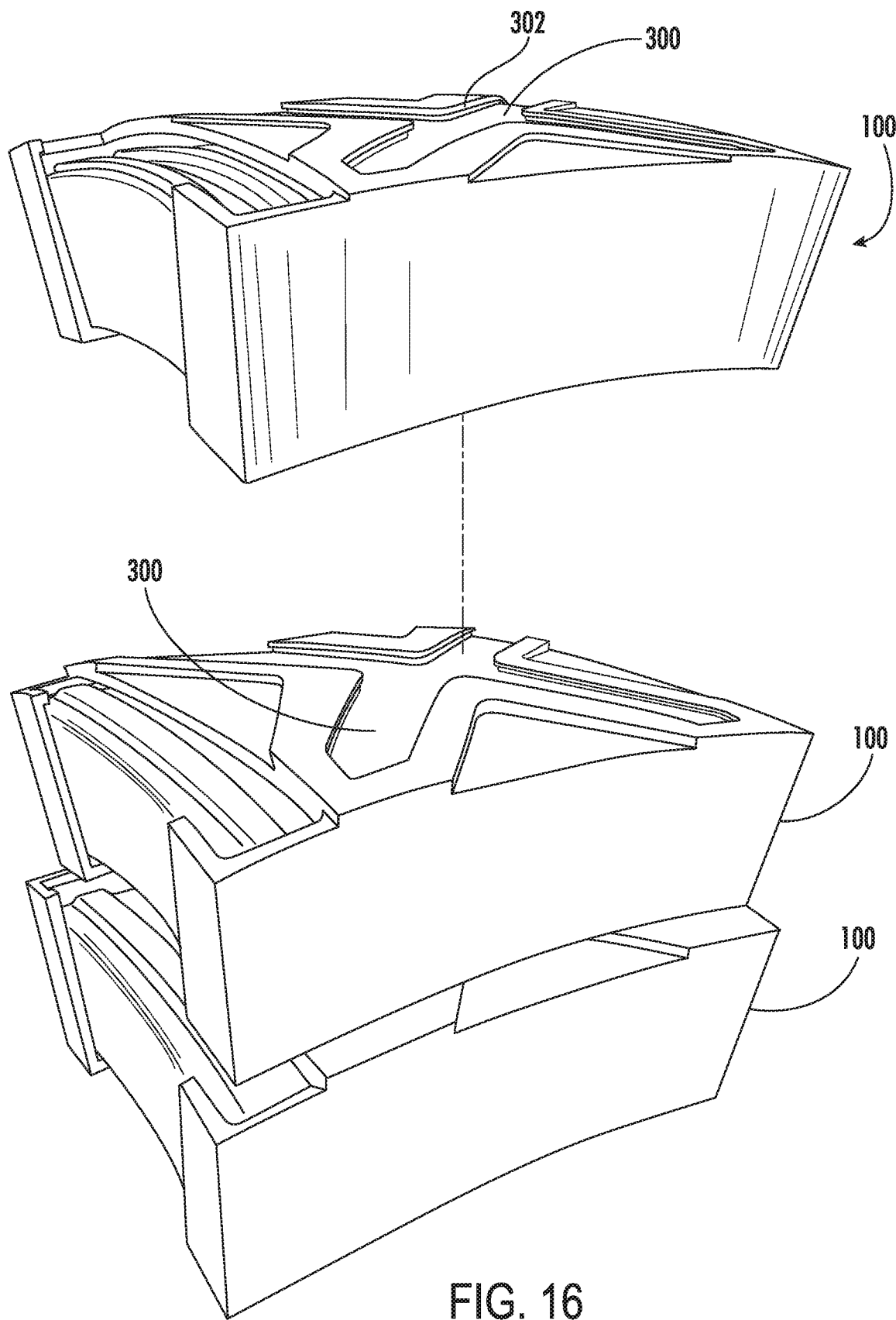
Figure 17:
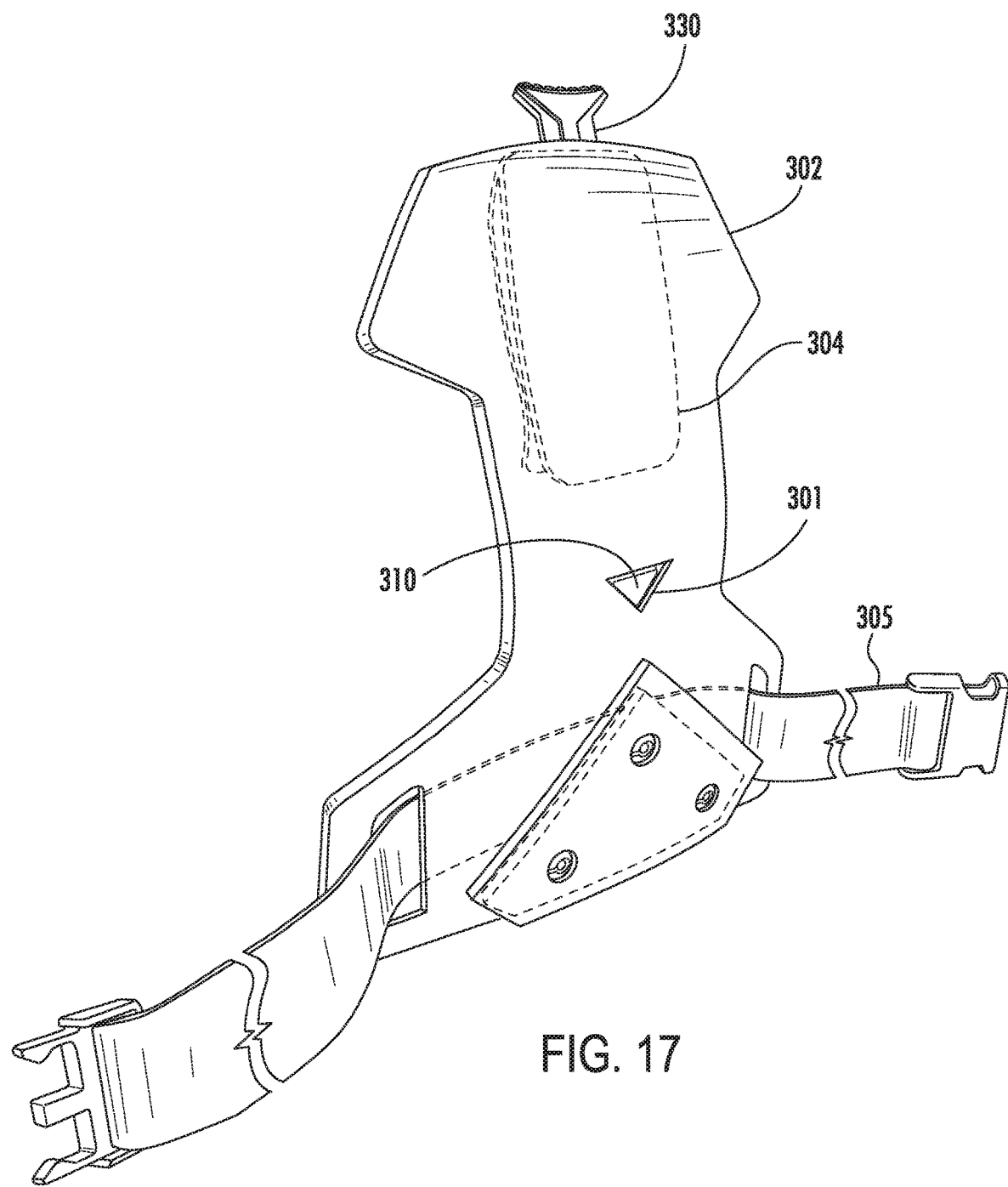
FIGS. 17-19 show an alternate embodiment of the attachment mechanism.
Figure 18:
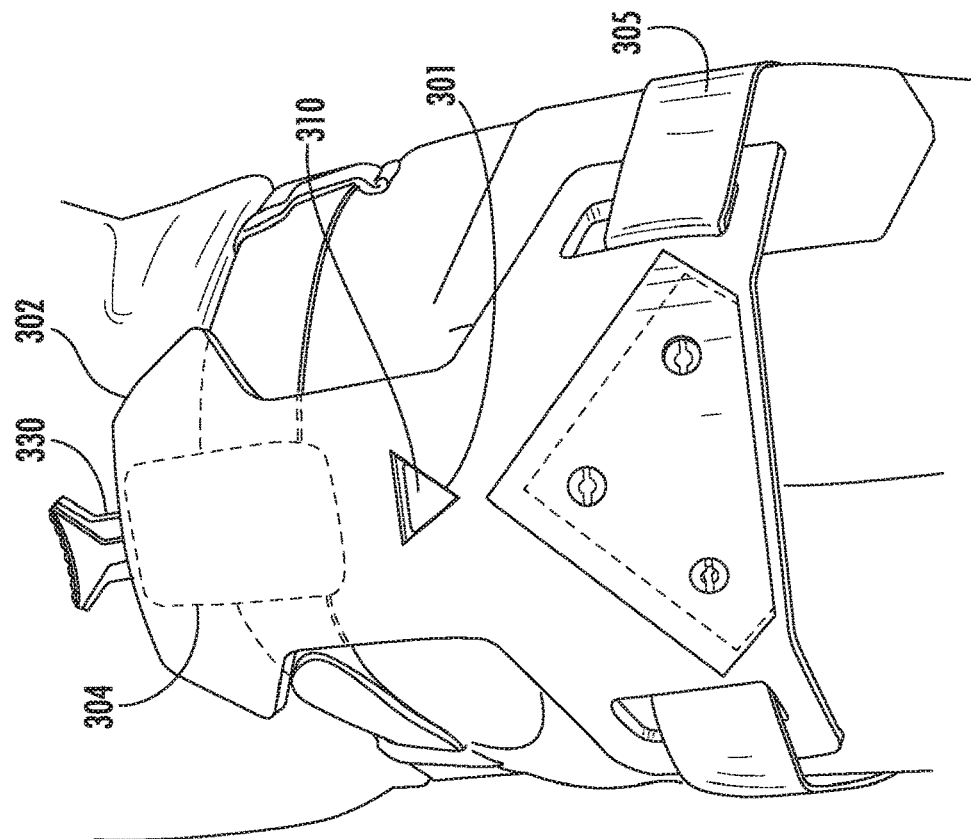
Figure 19:
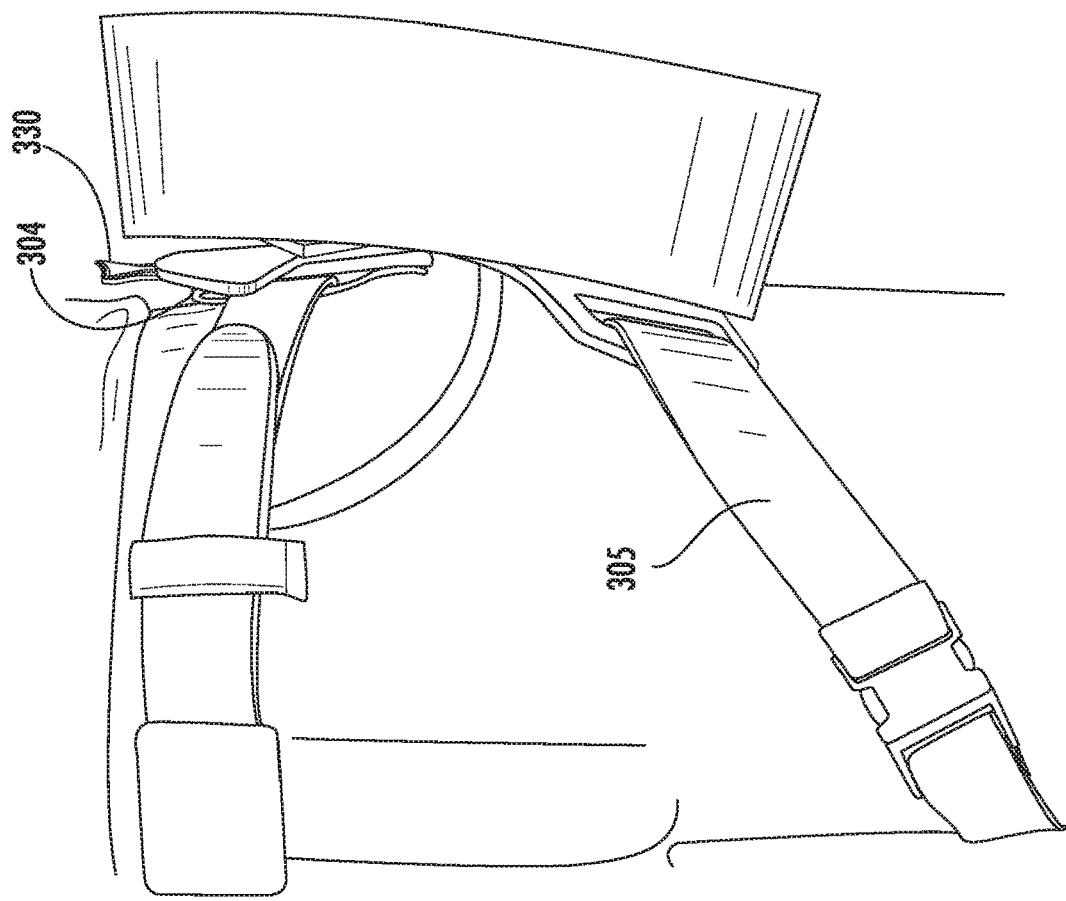

FIGS. 1-16 illustrate an embodiment for mounting the dispenser on a torso and FIGS. 17-19 show an embodiment for mounting the dispenser on a hip/leg (or even shoulder or arm). A firearm magazine dispenser may include a rigid housing case, a biasing member within the case, an attachment mechanism, and a vest cover, belt and/or other clothing or equipment that accepts the attachment mechanism. It also may include a disposable or reusable cover and/or a strap to secure a stack of magazine dispensers.

As seen in FIGS. 1-6, the dispenser 100 comprises a biasing wall 110, a bottom wall 120 opposite the biasing wall 110, an attachment wall 130 and an outward facing wall 140 opposite the attachment wall 130 that form a storage space 115 configured to house a stack of firearm magazines 150.

The biasing member 115 is attached to the biasing wall 110 and biasing plate 117 and is configured to exert pressure on the stack of magazines 150 such that the magazines are advanced within the case 100 toward the front wall 140 and an exit slot 160 on the outward facing wall 130.

The dispenser 100 may be plastic, composite, or other rigid material, such as metal, tin or aluminum.

The exit slot 160 may be sized just larger than a long-edge profile of one magazine such that a magazine can be pulled out of the dispenser 100 from the opening or exit slot 160. In some embodiments, the exit slot 160 only exposes the length-wise, narrow edge profile of the magazine, protecting the area of the magazine from which the ammunition is expelled. The exit slot 160 may be configured to expose the face of the magazine and the length-wise profile of the magazine. The exit slot 160 may expose the face and both length-wise profiles of the magazine but covers the ends of the magazine. The exit slot 160 may be configured to match the area where a user's hand would grab the magazine. The exit slot 160 may be configured to allow easy extraction of a magazine but not expose the bullet area of the magazine.

The exit slot 160 may be configured to allow quick and easy extraction of a magazine in one step and without having to remove a cover to expose the exit slot and yet while protecting the area of the magazine from which the ammunition is expelled. The exit slot 160 may be configured to operate in a vertical or horizontal position. The exit slot 160 is configured so that a user's fingers can wrap around the face and length-wise profile of the magazine while leveraging or pushing against the outward facing wall 140 for quick and easy extraction of the magazine.

The dispenser 100 can be hung on a user's vest or clothing or equipment so that the exit slot 160 is at the bottom of the dispenser 100 and closest to the ground. The dispenser 100 may be hung on a user's vest or clothing or equipment so that the exit slot 160 points toward the front of a user's body, or such that the exit slot 160 is at the top of the dispenser 100 and facing up. The dispenser 100 may be hung on a user's vest or clothing or equipment so that the exit slot 160 points toward the back of a user's body. The dispenser 100 may be worn or stored with the exit slot 160 configured in any given direction, according to a user's preference. The dispenser 100 can be worn or stored, with the exit slot 160 facing any direction, on a person's belt or other piece of clothing or equipment configured to accept the attachment mechanism 180/300. The dispenser 100 may be secured, with the exit slot 160 facing any direction, on any type of equipment, including on the inside or outside of a vehicle or carrying case or backpack, configured to accept the attachment mechanism 180.

Figure 1:
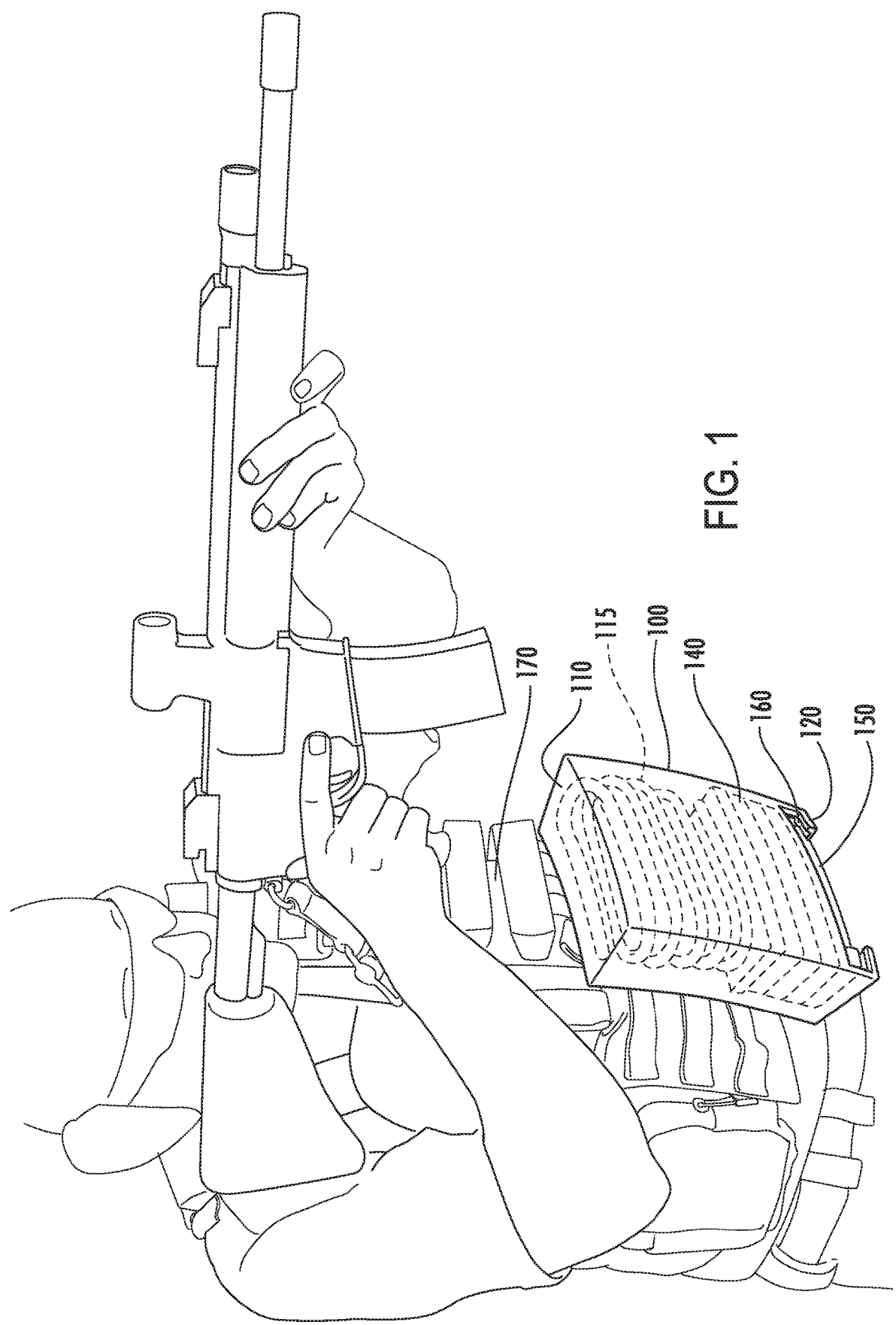
FIG. 1 shows a perspective view of the magazine dispenser in use.
Figure 2:
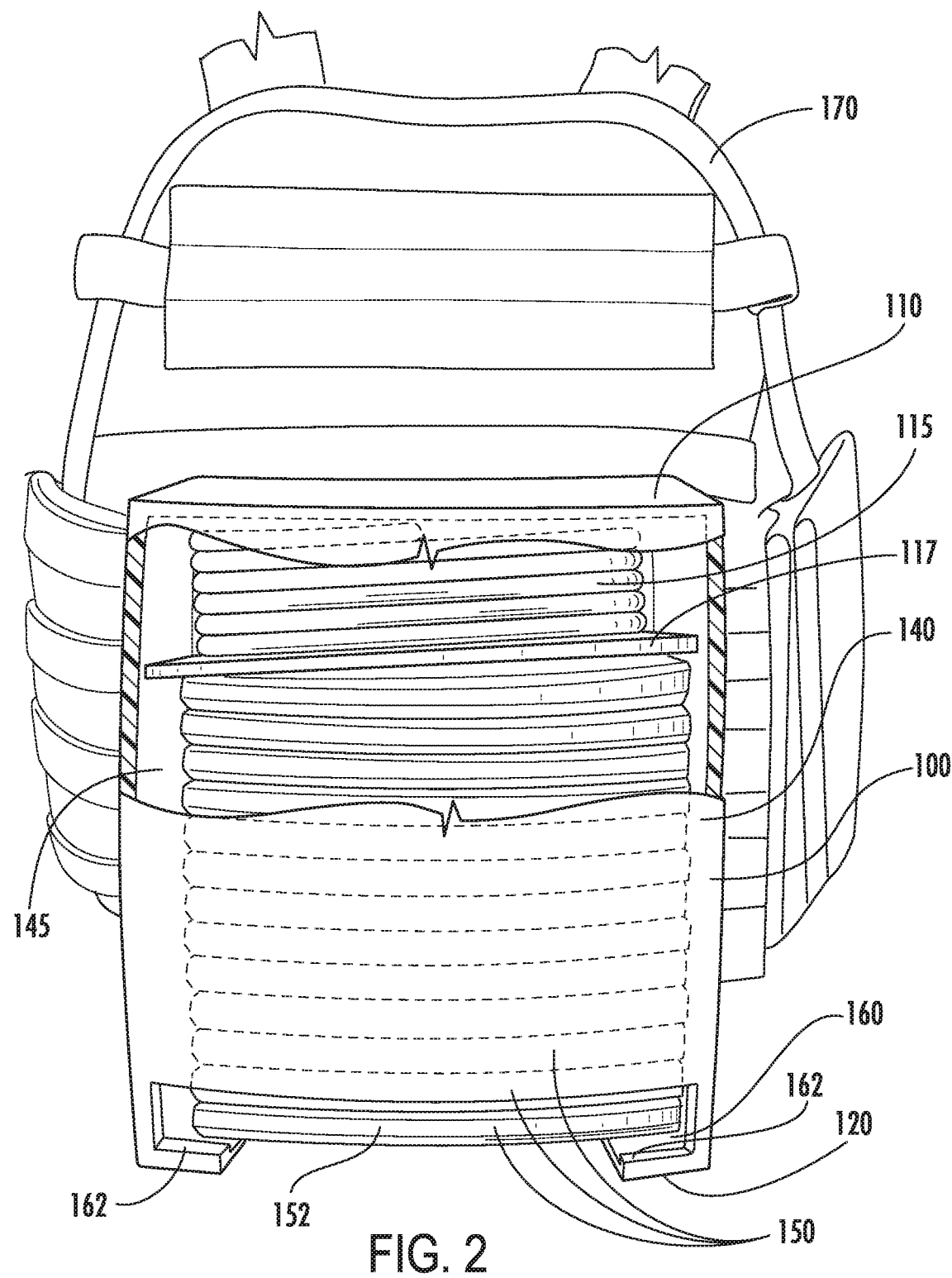
FIG. 2 shows a front view of the magazine dispenser in partial cross section.
Figure 3:
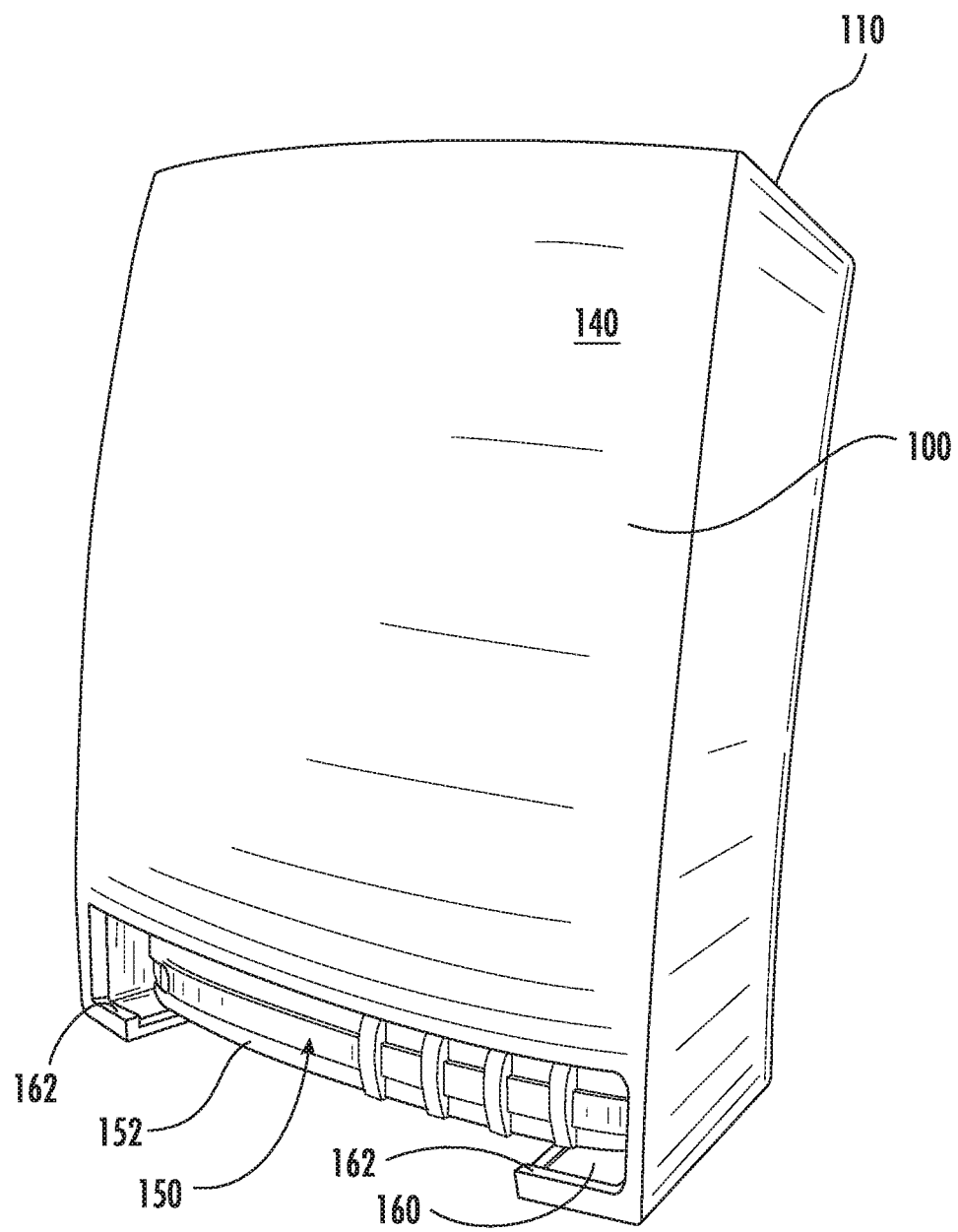
FIG. 3 shows a perspective view of the magazine dispenser.

The exit slot 160 may have an engagement lip 162 to prevent the lowest one of the magazines 152 of the magazine stack 150 from sliding out of the exit slot 160, as best seen in FIGS. 2 and 3.

The dispenser 100 may be contoured with the dispenser 100 bowed towards the outward facing wall 140, such that the dispenser 100 matches the contour of a user's body. In some embodiments, the dispenser 100 may be contoured in both the horizontal or vertical direction, with the dispenser 100 bowed away from the outward facing wall 140, such that the case 100 matches or simulates the contour of a user's body. The dispenser 100 may be curved in both the horizontal and vertical direction so that it fits flush or close to flush with a user's body regardless of the orientation.

Figure 4:
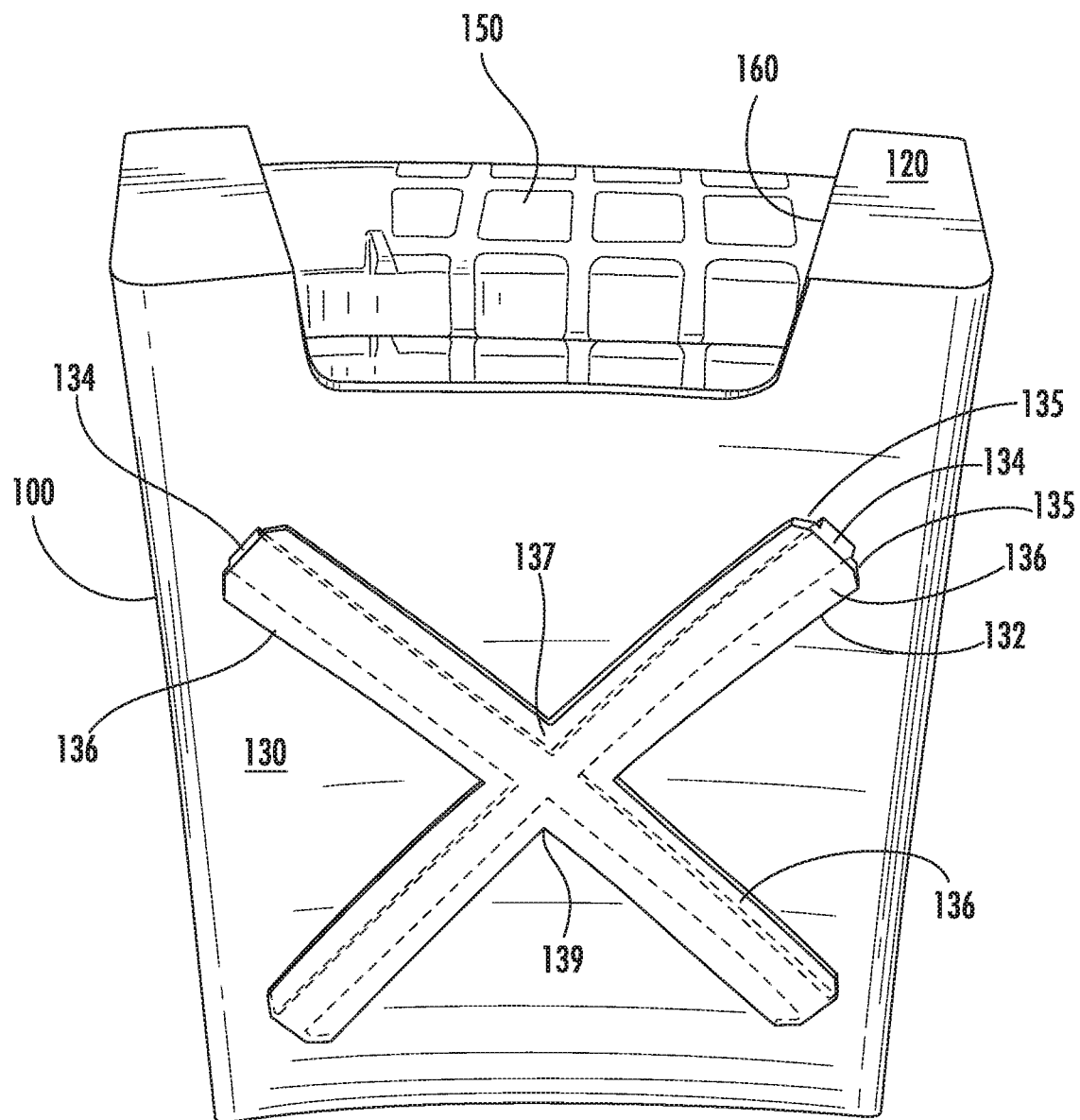
FIG. 4 shows a rear bottom view of the magazine dispenser.
Figure 6:
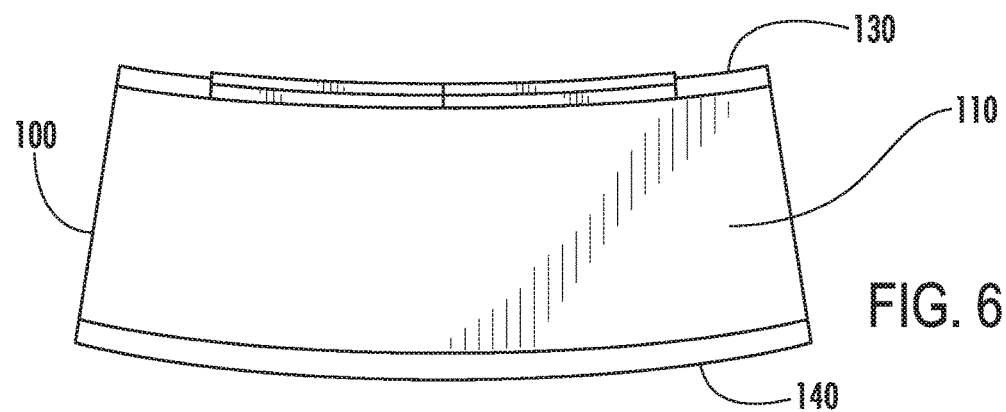
FIGS. 5-7 show front elevation, top, and bottom views of the magazine dispenser respectively.
Figure 5:
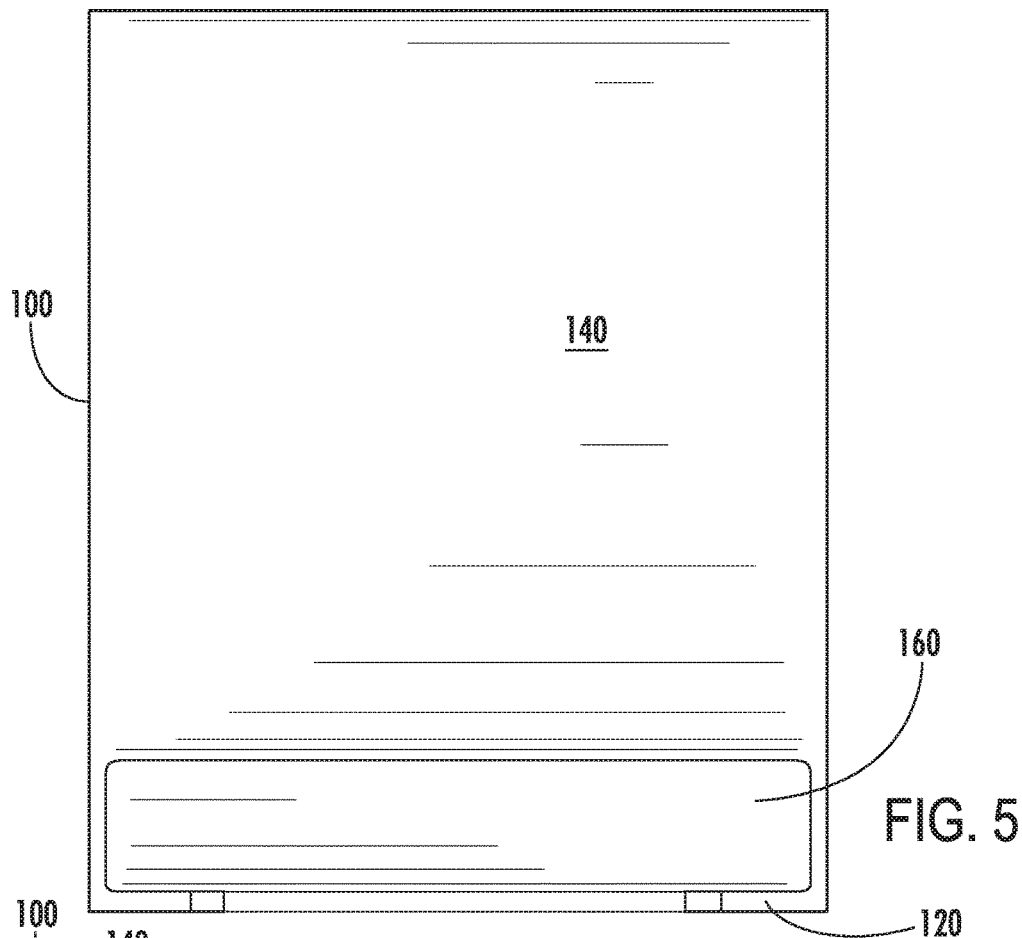
Figure 7:
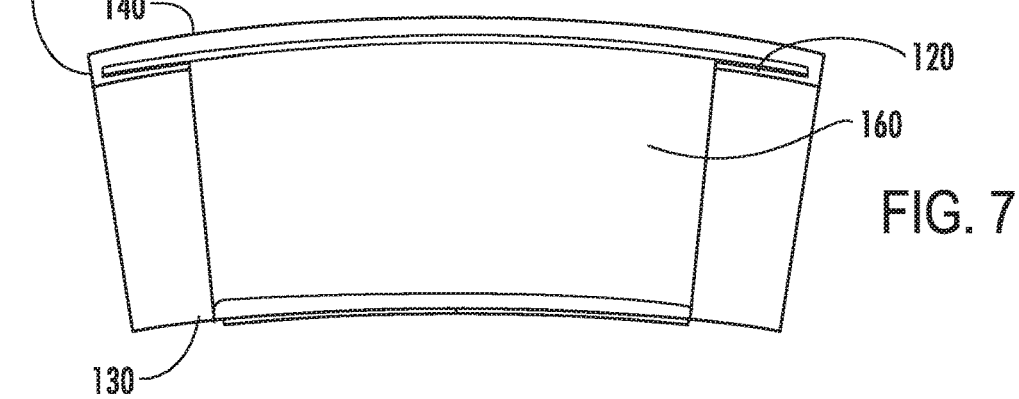
Figure 10:
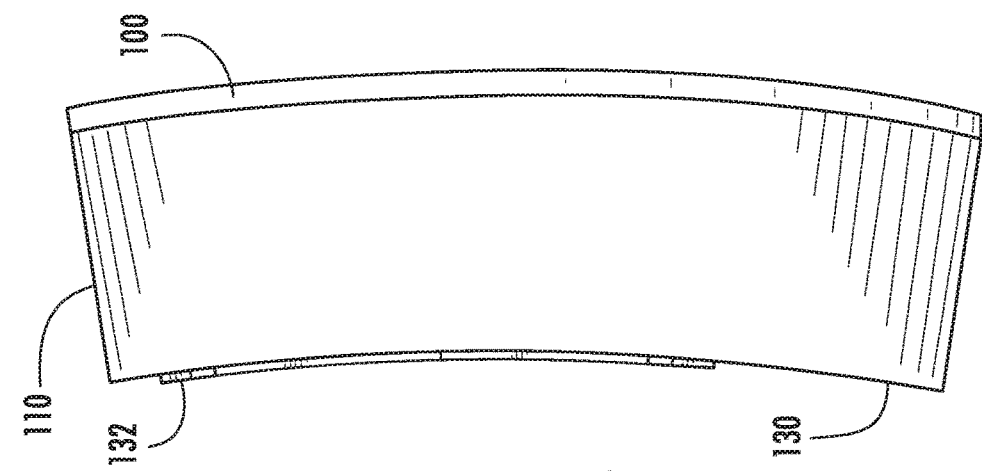
FIGS. 8-10 show rear elevation, left, and right side views of the magazine dispenser respectively.
Figure 8:
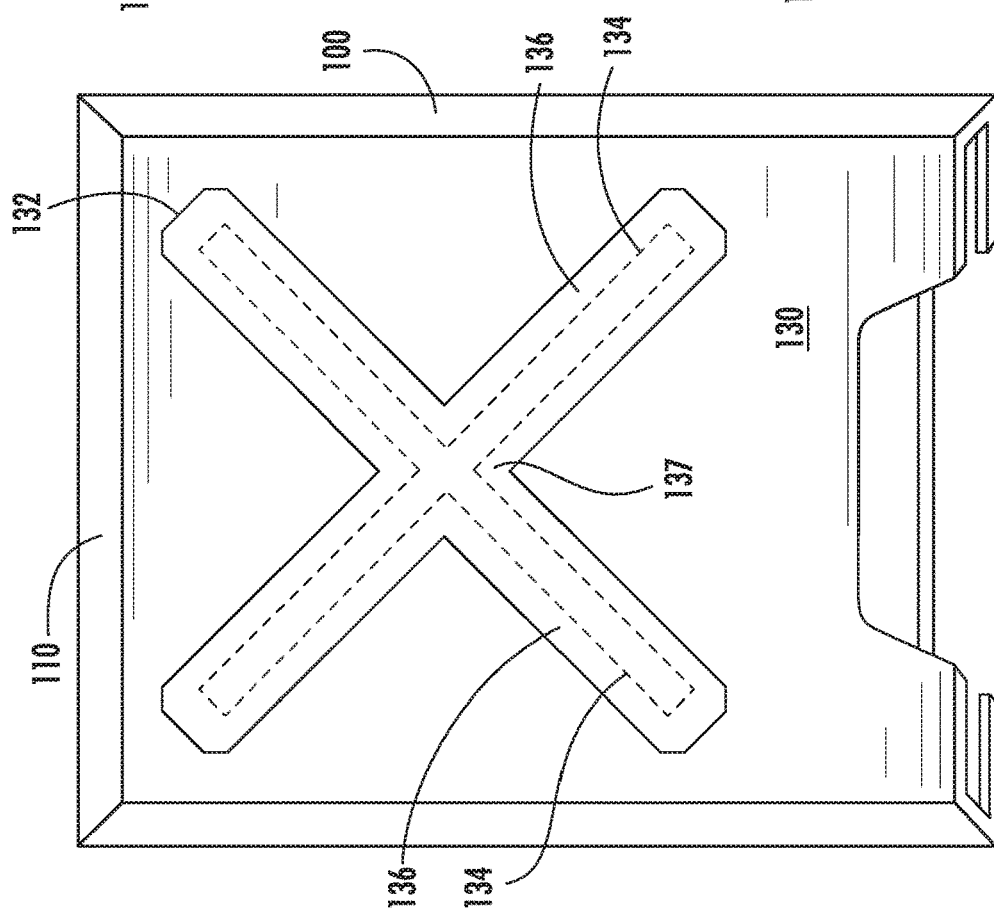
Figure 9:
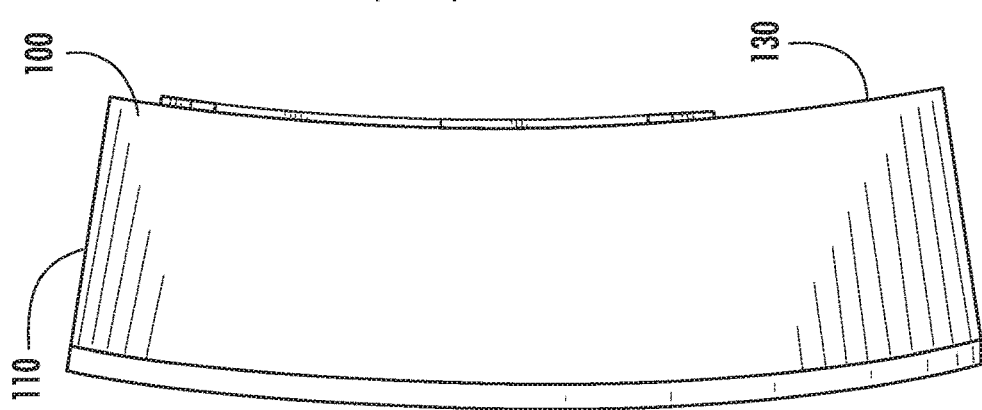

As can be best seen in FIGS. 4 and 8-10, the dispenser 100 attachment wall 130 includes an attachment portion 132 that extends therefrom. As shown, the attachment portion 132 is roughly X-shaped and contoured to the curvature of the attachment wall 130. The attachment portion 132 includes a dispenser engagement section 134 and an attachment tab 136 of differing widths. The attachment portion 132 can engage with other shaped mechanisms that may slip or press fit into the attachment gap 135 formed between the dispenser engagement section 134 and attachment tab 136. FIGS. 4 and 8 show upright attachment tab notch 137 that may engage to the attachment mechanism insert 190 described in more detail below with reference to FIGS. 11-14. The attachment portion 132 also has a locking notch 139 to more securely engage the dispenser 100 to the attachment mechanism, and is described in more detail below.

Figure 11:
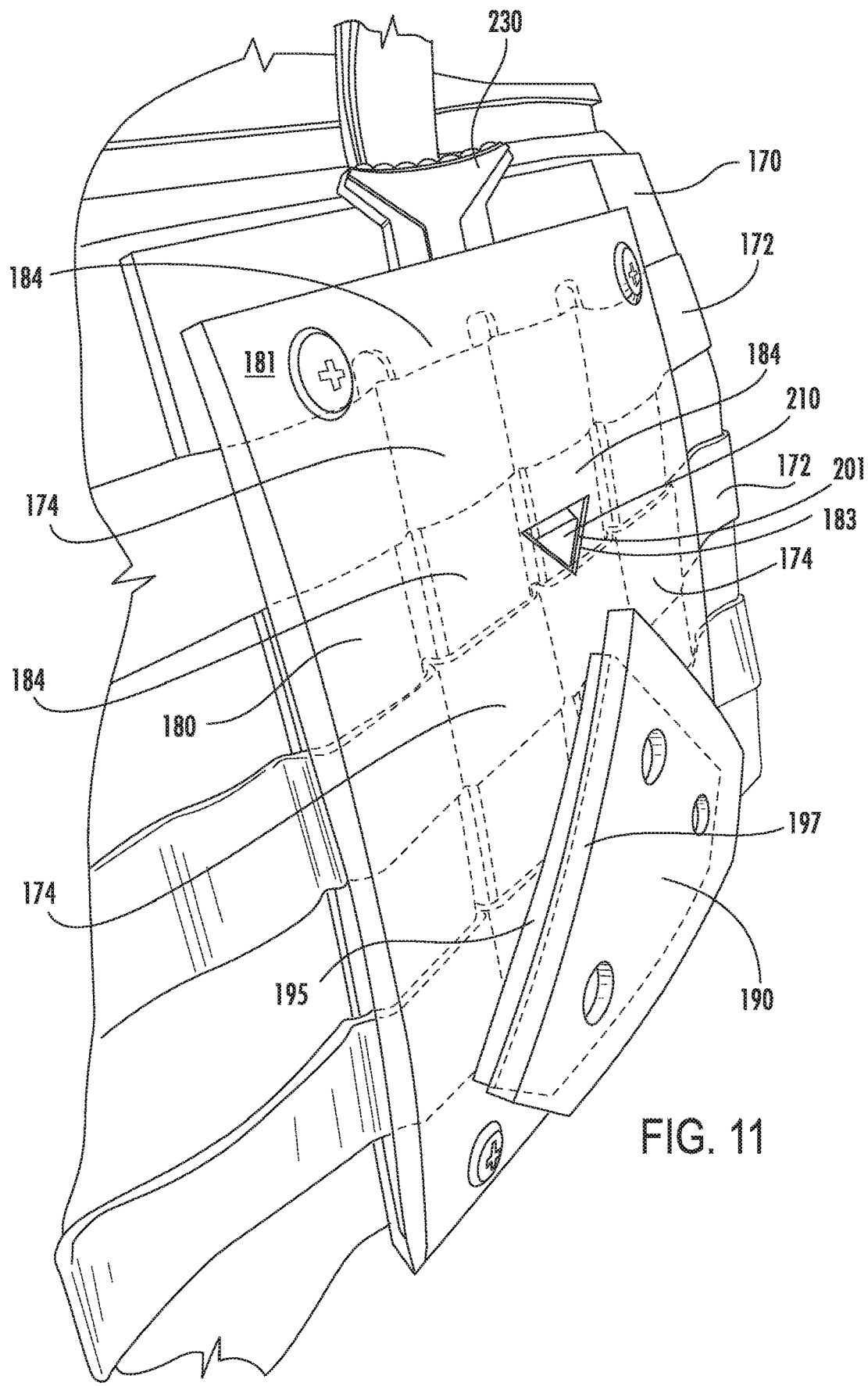
FIG. 11 shows a perspective view of the attachment mechanism.
Figure 12:
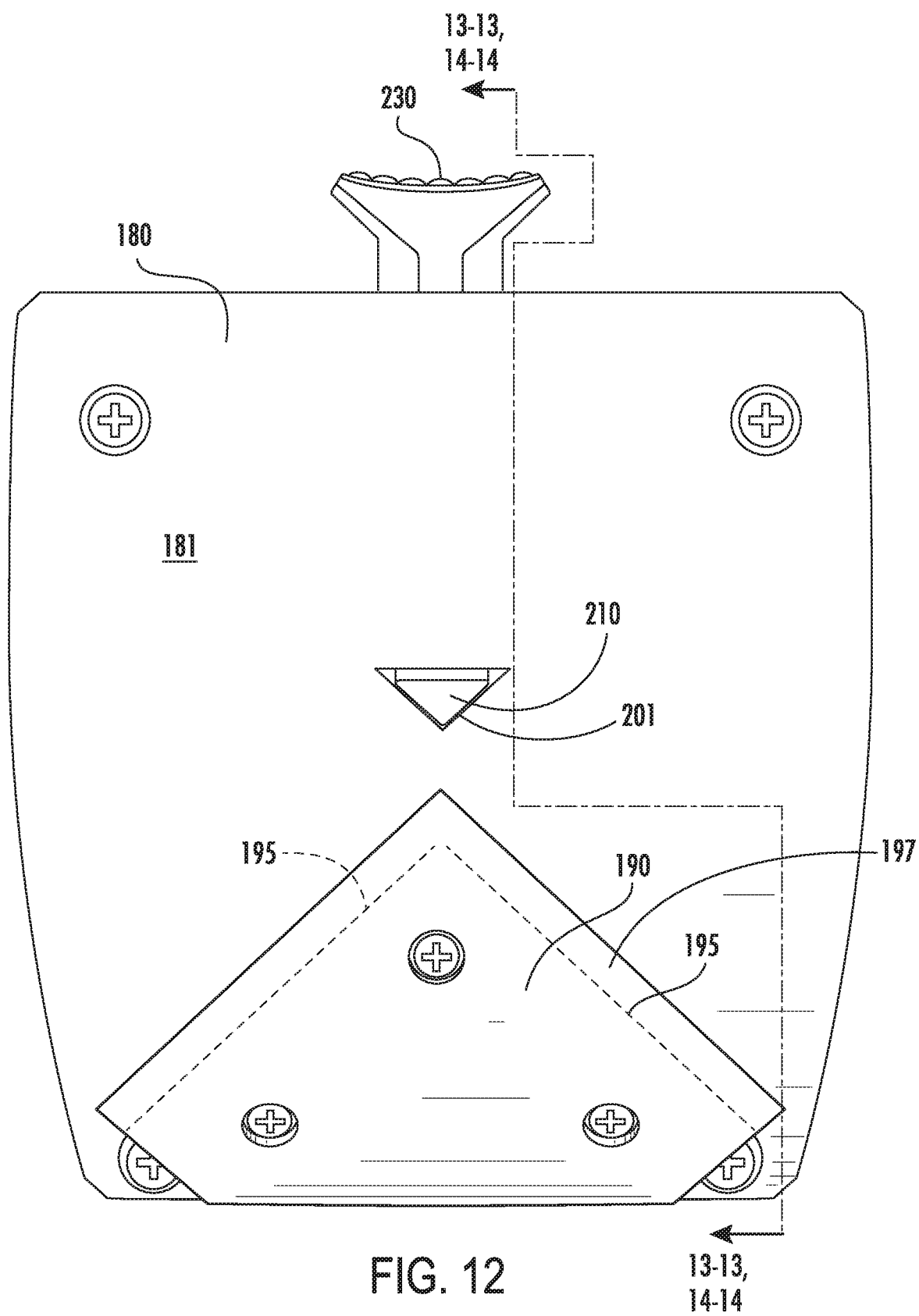
FIG. 12 shows a front elevation view of the attachment mechanism.

As shown in FIG. 11, the dispenser 100 may be engaged to an attachment mechanism 180 engaged to a vest cover 170 or a clothing cover or an outerwear cover, wherein the vest cover 170 includes straps 172 that has open loops 174 extending therefrom, into which engagement tabs 184 of the attachment mechanism 180 may extend. The dispenser 100 may be attached to the vest in other ways although as shown in FIG. 11, the dispenser 100, attachment mechanism 180, and vest cover 170 re each replaceable, which may be advantageous in a demanding environment. The attachment mechanism 180 may be configured to be attached directly to the user's clothing or a piece of equipment, including a vehicle or a carrying case.

As shown in FIGS. 11-14, the attachment mechanism 180 may include a rigid, triangular-shaped insert 190 configured to engage with the attachment portion 132. The triangular-shaped insert 190 may be configured to slide into the upright attachment tab notch 137 when its overhanging lip 197 engages attachment gap 135 in any orientation, although preferably in the upright position by engaging the upright attachment tab notch 137 such that magazines 150 are facing downwards and more resistant to water or other contaminant ingress.

When the dispenser 100 and attachment mechanism 180 are engaged to one another as described, they may be even more securely engaged using a biased catch 210 that extends through the attachment mechanism front surface 181 at a catch opening 183 therein. FIG. 14 shows the attachment mechanism 180 in a rest state when unengaged and also when engaged and FIG. 13 shows the attachment mechanism during the act of engaging or disengaging the dispenser 100 from the attachment mechanism 180. (FIGS. 13 and 14 are shown not contoured to a wearer's body, it being understood that such contouring is possible as shown in FIG. 11.)

During an action of engaging the dispenser 100 to the attachment mechanism 180, the dispenser 100 attachment wall 130 slides along or presses against attachment mechanism front surface 181 driving the catch 210 into the opening 201 against the action of biasing spring 220. As the dispenser 100 comes to have its upright attachment tab notch 137 rest against the attachment mechanism engagement surface 195, the upright attachment tab notch 137 clears a bottom portion 212 of the catch 210, and the catch biasing spring 220 drives the catch 210 through the opening 183, such that the catch 210 engages the tab notch 137 by extending against the attachment tab 136 or into the gap 135, depending on the catch shape and also an angle at which the catch 210 extends from the front surface 181 when a top surface 214 of the catch 210 engages the opening 183 top surface 183a as shown in the rest position of FIG. 14.

During an action of disengaging the dispenser 100 from the attachment mechanism 180, a release plunger 230 is depressed against the action of release plunger biasing spring 232 to the position in FIG. 13. In this position, the release plunger catch release surface 234 engages the top surface 214 of the catch 210, driving the catch 210 against the catch biasing spring 220, withdrawing the catch 210 from any engagement with the dispenser 100 and into the opening 183. This allows for easy removal of the dispenser 100 from the attachment mechanism 180.

Figure 15:
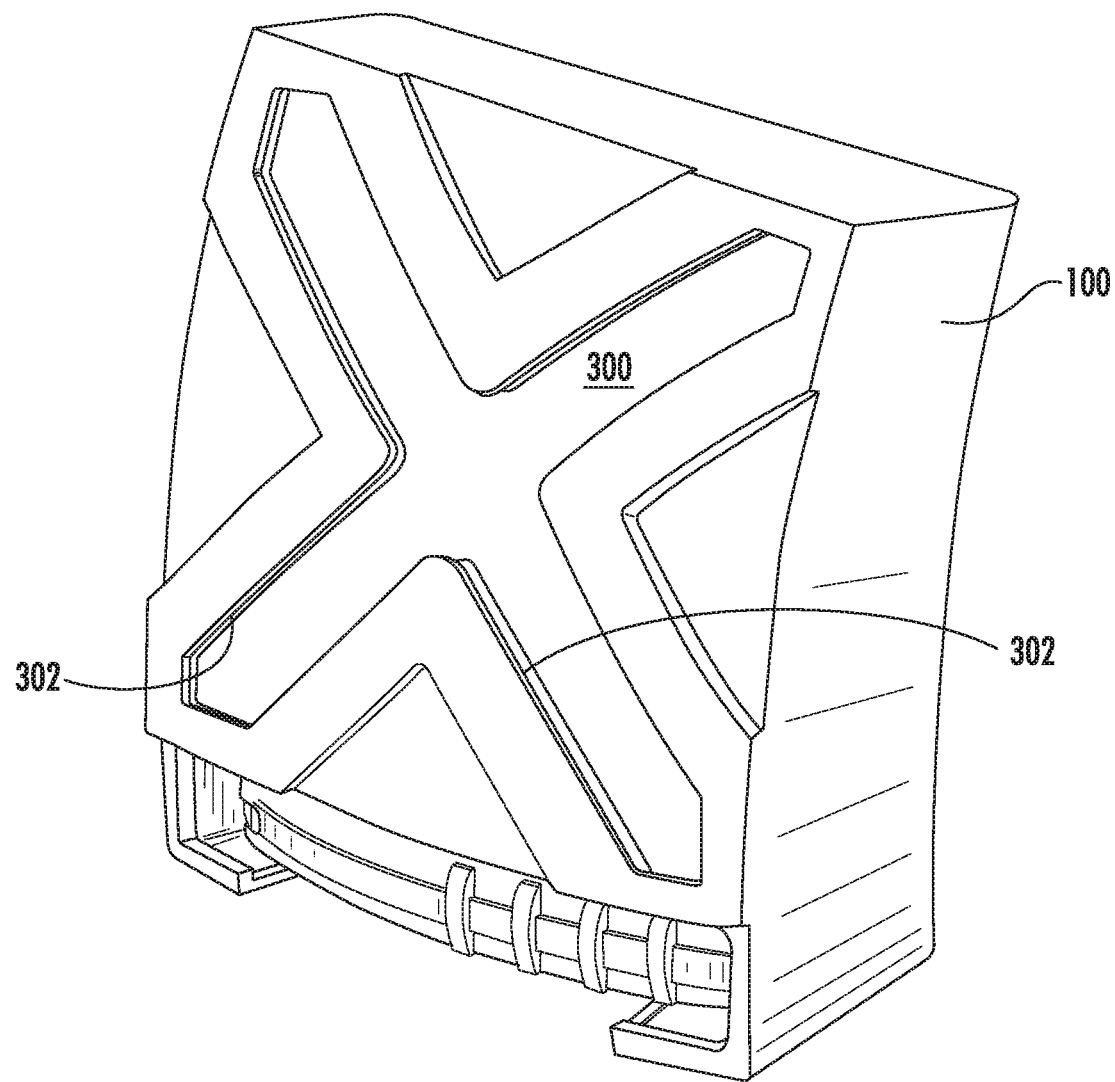
FIGS. 15 and 16 show an alternate embodiment of the magazine dispenser.

As shown in FIGS. 15 and 16, the dispenser 100 may be stackable with other dispensers, due to an x-shaped receiving area 300 that is sized slightly larger than the x-shaped attachment portion 132 from FIG. 4. The receiving area may also include an overhanging lip 302 that engages with the attachment portion gap 135 such that dispensers may be engaged one to another. The overhanging lip 302 may not be desired in some instances as it may make disentangling dispensers 100 cumbersome.

In the stackable configuration of FIG. 16, one or more dispensers 100 may include a strap that is used to secure the stack for carrying or engagement to another object. The dispenser 100 may also include a cover to seal off any openings in the dispenser 100.

FIGS. 17-19 show an alternate hip attachment mechanism 302 that should be readily understandable in view of the previous attachment mechanism 180 already described. The hip attachment mechanism 302 may be mounted to a person's waist, leg, or even arm/shoulder using a strap 305 and/or belt clip 304. All other aspects of the hip attachment mechanism 302 are similar to the torso attachment mechanism 180 where plunger 330 activates the catch 210 that extends through opening 301.

While the dispenser has been described with reference to the embodiments above, a person of ordinary skill in the art would understand that various changes or modifications may be made thereto without departing from the scope of the claims.

I claim:

1. A firearm magazine dispenser comprising:
a housing;
a biasing member within the housing;
wherein the housing comprises a biasing wall, a bottom wall opposite the biasing wall, an attachment wall, and an outward facing front wall opposite the attachment wall, that define a storage space configured to house a stack of magazines;
wherein the biasing member is configured to exert pressure on the stack of magazines such that the stack of magazines are advanced within the housing toward the bottom wall and an exit slot on the outward facing wall;
wherein the exit slot is sized such that a single magazine from the stack of magazines can be pulled from the housing therethrough; and
wherein the housing includes an engagement lip integral with the housing that extends upwards from the bottom wall parallel to the front wall towards the biasing member proximate the exit slot.

2. The firearm magazine dispenser of claim 1, wherein the exit slot includes an opening in the bottom wall.

3. The firearm magazine dispenser of claim 1, wherein in order to release the single magazine through the exit slot, the stack of magazines must be biased against the biasing member such that the single magazine does not engage the engagement lip.

4. The firearm magazine dispenser of claim 1, wherein the housing is bowed away from the outward facing wall.

5. The firearm magazine dispenser of claim 1, wherein the biasing member is attached to a plate that engages the stack of magazines.

6. A firearm magazine dispenser comprising:
a housing;
a biasing member within the housing;
wherein the housing comprises a biasing wall, a bottom wall opposite the biasing wall, an attachment wall, and an outward facing front wall opposite the attachment wall, that define a storage space configured to house a stack of magazines;
wherein the biasing member is configured to exert pressure on the stack of magazines such that the stack of magazines are advanced within the housing toward the bottom wall and an exit slot on the outward facing wall;
wherein the exit slot is sized such that a single magazine from the stack of magazines can be pulled from the housing therethrough; and
wherein the housing includes an engagement lip integral with the housing that extends towards the biasing member proximate the exit slot;
wherein the attachment wall includes an attachment portion extending therefrom;
wherein the attachment portion includes a dispenser engagement section engaged to the attachment wall and an attachment tab, wherein the dispenser engagement section and attachment tab have different widths.

7. The firearm magazine dispenser of claim 6, wherein the dispenser engagement section and attachment tab define an attachment gap therebetween.

8. The firearm magazine dispenser of claim 7, further comprising an attachment mechanism, wherein the attachment mechanism engages the dispenser engagement section.

9. The firearm magazine dispenser of claim 8, wherein the attachment mechanism comprises an insert that is shaped to engage the dispenser engagement section.

10. The firearm magazine dispenser of claim 9, wherein the insert is triangle shaped and the dispenser engagement section is x-shaped.

11. The firearm magazine dispenser of claim 10, wherein the insert comprises an overhanging lip that engages the attachment gap.

12. The firearm magazine dispenser of claim 8, wherein the attachment portion includes a catch that engages the dispenser engagement section.

13. The firearm magazine dispenser of claim 12, wherein the catch is movable between a rest state and engaging/disengaging state.

14. The firearm magazine dispenser of claim 13, wherein in the engaging/disengaging state, the catch is depressed into an opening in the attachment mechanism.

15. The firearm magazine dispenser of claim 14, wherein in the rest state, the catch extends through the opening.

16. The firearm magazine dispenser of claim 8, wherein the attachment mechanism includes tabs shaped to engage loops on a vest.

17. The firearm magazine dispenser of claim 8, wherein the attachment mechanism is shaped to be worn on a person's torso.

18. The firearm magazine dispenser of claim 8, wherein the attachment mechanism is shaped to be work on a person's hip.

19. The firearm magazine dispenser of claim 6, wherein the attachment portion is shaped to engage a receiving area on the outward facing wall of a second magazine dispenser such that multiple firearm magazine dispensers can be stacked.

* * * * *